United States Patent
Sato et al.

(10) Patent No.: US 6,551,687 B1
(45) Date of Patent: Apr. 22, 2003

(54) WRAPPING FILMS

(75) Inventors: Nobuya Sato, Tochigi (JP); Michihide Yamauchi, Tochigi (JP); Haruo Sakahashi, Tochigi (JP); Masamichi Senoo, Tochigi (JP); Hiroshi Otsuka, Tochigi (JP); Keiji Abe, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/787,911

(22) PCT Filed: Oct. 5, 1999

(86) PCT No.: PCT/JP99/05475

§ 371 (c)(1),
(2), (4) Date: Mar. 30, 2001

(87) PCT Pub. No.: WO00/20296

PCT Pub. Date: Apr. 13, 2000

(30) Foreign Application Priority Data

Oct. 6, 1998 (JP) ............................................. 10-283980
Mar. 23, 1999 (JP) ............................................. 11-078570

(51) Int. Cl.[7] ................................................. B32B 3/00
(52) U.S. Cl. ........................ 428/141; 428/343; 428/212; 428/523
(58) Field of Search ................................ 428/141, 343, 428/212, 523

(56) References Cited

U.S. PATENT DOCUMENTS 4,518,643 A    5/1985   Francis

FOREIGN PATENT DOCUMENTS

EP  0 522 758    1/1993
WO  WO 97/25256  7/1997

OTHER PUBLICATIONS

Derwent Publications, AN 1992–335785, JP 04 239627, Aug. 27, 1992.

Derwent Publications, AN 1998–408858, JP 10 168309, Jun. 23, 1998.

*Primary Examiner*—William P. Watkins, III
(74) *Attorney, Agent, or Firm*—Oblon, Spivak, McClelland, Maier & Neustadt, P.C.

(57) ABSTRACT

The wrapping film of the present invention has a sticky surface, convexities, and flat portions of film disposed between the convexities on at least one side, and comprises at least one agent selected from the group consisting of a surface active agent, an adhesive agent, and an oily agent. The wrapping film has a shear adhesion strength of at most 400 cN/25 cm$^2$ when measured subsequent to bringing said sticky surface into contact with a glass surface having a surface roughness of from 0.7 to 1.5 nm under a pressure of 4 Pa, a shear adhesion strength of at least 700 cN/25 cm$^2$ when measured subsequent to bringing said sticky surface into contact with said glass surface under a pressure of 4 kPa, and the ratio of the height of the convexities to the thickness of the flat portion ranges from 0.03 to 1.67. The wrapping film may also have a surface with a roughness and waviness (Ra') of at least 40 nm as measured in a non-extended state, and an elongation at break of at least 10%.

16 Claims, No Drawings

WRAPPING FILMS

TECHNICAL FIELD

This invention relates to wrapping films permitting easy handling, and specifically to wrapping films each of which does not cling to itself before wrapping, can exhibit good clinging properties to a wrapped item upon wrapping, and can be peeled off with ease after wrapping.

BACKGROUND ART

As wrapping films for domestic or commercial use, films made primarily of polyvinylidene chloride, polyvinyl chloride, polyethylene, polypropylene, polymethylpentene or the like are used. They are all available in a form such that they are wound on paper-made cores and upon use, are rolled out and cut for use. In the case of a wrapping film with high clinging properties, however, it is often observed irrespective of its material that, after cutting the wrapping film and until wrapping an item with the wrapping film, the wrapping film clings to itself and the wrapping operation is hence inconvenienced. Further, the clinging of the wrapping film to itself usually leads to a reduction in the usable part of the film, resulting in a waste.

In view of the purpose of use of wrapping films, they are also required to have sufficient clinging properties and easy peelability because they are primarily employed to wrap food items for storage and subsequent to the storage, are peeled off to use the food items.

In the case of a wrapping film disclosed in Japanese Patent Publication (Kokai) No. SHO 58-1030, a non-self-clinging portion comprising a number of extremely fine, linear or nonlinear scuff marks is formed on a surface layer of the wrapping film at a peripheral edge portion or one of side edge portions thereof by an abrasive means with a view to improving the peelability of the wrapping film from itself. No clinging properties is therefore exhibited at this non-self-clinging portion. Although no clinging of the film to itself takes place at the non-self-clinging portion, the problem of clinging still remains unsolved because the wrapping film is tacky at the remaining portions. In addition, the non-self-clinging portion may prevent thorough wrapping as items to be wrapped, such as containers and food items, are diverse in size.

To improve both handling ease and airtight sealing performance, WO 97/25256 proposes as a wrapping film a roughened film with a pressure-sensitive adhesive, which shows minimum adhesive or cling properties until activated by a user but exhibits sufficient adhesive or cling properties after activation. The pressure-sensitive adhesive is arranged such that it surrounds non-adhesive protrusions and has a thickness less than the height of the non-adhesive protrusions. Upon application of an external force (compressive force or tensile force), a region where the pressure-sensitive adhesive is arranged is caused to adhere to a target surface to be wrapped, whereby sufficient adhesive properties can be exhibited. This publication describes the roughened film as an improved storage wrap material characterized in that an active side exhibits, as the sufficient adhesive properties, an adhesion peel force of at least one ounce per inch width after activation by a user and also in that the active side includes the pressure-sensitive adhesive. Adhesive properties to a target surface to be wrapped are sufficient insofar as an adhesion peel force of at least one ounce per inch width is provided. Upon peeling off the wrapping film from the target surface after use, however, the adhesion force is so strong that the peelability is insufficient. The wrapping film is therefore very difficult to use. Further, the arrangement of the adhesive results in migration of the adhesive to plates or the like or to food items, and is therefore not preferred from standpoint of safety.

According to the above-publication, the active side is described to be activated under a compressive force of at least 0.1 pound per square inch. If the film is wound into a roll by a conventional method, the active side is prematurely activated in the course of its winding, thereby making it impossible to dispense the film from the roll. To permit rolling-out of the film by a light force, the film has to be formed into a roll by an extremely weak force so that the active side is not activated. This however results in a loose roll and hence in a large dispensing carton, leading to practical inconvenience in that it is not easy to hold the film in hand and to use the same and further in that the film is quickly used up as the rolled length is short. In addition, the film is accompanied by a further drawback that its productivity is not high because it is wound up by an extremely weak force.

The present invention therefore has an object the provision of a wrapping film, preferably a rolled wrapping film having good handling properties, which features minimized migrants to foods, does not cling to itself before wrapping, exhibits good clinging properties to a target item upon wrapping, and has good peelability to permit easy removal after wrapping.

DISCLOSURE OF THE INVENTION

The present inventors proceeded with a detailed study on wrapping operations by wrapping films. It was revealed that a pressure under which a film clings to itself after the film is cut and until a target item such as a container or a food item is wrapped is at least about 4 Pa and also that a pressure required to hold the target item such as the container or the food item in the wrapped state subsequent to its wrapping is at least about 4 kPa. The present inventors have proceeded with a further investigation, and as a result, have found that the above-described object can be achieved when a film is provided with clinging properties such that the film does not exhibit clinging properties to itself when a pressure is about 4 Pa or lower, exhibits clinging properties sufficient for wrapping for the first time when a pressure reaches about 4 kPa or higher which is a pressure applied upon using the film, and is easy to be peeled off.

Another investigation has also been made as to the ease in peeling off wrapping films after wrapping target items such as containers or food items. As a result, it has been found that clinging properties of certain level or higher make it difficult to peel off a wrapping film and hence lead to very difficult handling.

The present invention therefore provides a wrapping film (which may hereinafter be called "the first invention") having a sticky surface on at least one of sides thereof, characterized in that a shear adhesion strength as measured subsequent to bringing the sticky surface into contact under a pressure of 4 Pa with a glass surface having a surface roughness of from 0.7 to 1.5 nm is at most 400 cN/25 cm$^2$, and a shear adhesion strength as measured subsequent to bringing the sticky surface into contact under a pressure of 4 kPa with the glass surface is at least 700 cN/25 cm$^2$.

In addition, the present inventors have also proceed with a further investigation as to relationships between surface characteristics of films and properties as wrapping films. As a result, it has been found that a film does not cling to itself when its surface roughness and waviness (Ra') is 40 nm or greater but clings to itself when its surface roughness and waviness (Ra') is smaller than 40 nm. As a consequence, it has been found that a surface roughness and waviness (Ra') of at least 40 nm makes it possible to provide a wrapping film having good handling properties such that it does not cling to itself before wrapping, exhibits good clinging properties to a target item when wrapping, and has good peelability to permit easy removal after wrapping. In other words, it has been found that, when a wrapping film has a surface roughness and waviness (Ra') of at least 40 nm, the film does not show sufficient clinging properties due to its poor surface smoothness and does not cling to itself even when brought into an overlapped relation with itself. It has also been found that, when a user stretches the film and wraps a target item with it, convexities on the surface are eliminated and the inherent clinging properties of the film are exhibited.

Accordingly, the present invention also provides a wrapping film (which may hereinafter be called "the second invention") characterized in that the wrapping film has on a surface thereof convexities sufficient to provide the surface with a roughness and waviness (Ra') of at least 40 nm as measured in a non-extended state, and has an elongation at break of at least 10%.

BEST MODES FOR CARRYING OUT THE INVENTION

The wrapping film according to the first invention is a wrapping film, in which at least one of sides thereof has a sticky surface, a shear adhesion strength as measured subsequent to bringing said sticky surface into contact under a pressure of 4 Pa with a glass surface having a surface roughness of from 0.7 to 1.5 nm is at most 400 cN/25 cm$^2$, and a shear adhesion strength as measured subsequent to bringing said sticky surface into contact under a pressure of 4 kPa with said glass surface is at least 700 cN/25 cm$^2$.

Described specifically, control of the clinging properties of a sticky surface of a wrapping film such that a shear adhesion strength (hereinafter called a "pre-wrapping shear adhesion strength") as measured after bringing the sticky surface into contact under a pressure of 4 Pa with a glass surface having a surface roughness Ra (arithmetic mean roughness), as defined in B601-1994 of the Japan Industrial Standards (JIS), of from 0.7 to 1.5 nm becomes 400 cN/25 cm$^2$ or less, preferably 300 cN/25 cm$^2$ or less, more preferably 260 cN/25 cm$^2$ or less makes it possible to effectively prevent the wrapping film from clinging to itself after cutting the film and until wrapping a target item with the film, thereby providing the film with improved handling properties and bringing about improvements in wrapping operation. A pre-wrapping shear adhesion strength greater than 400 cN/25 cm$^2$ makes it difficult to peel off the film if the film clings on itself. The smaller the pre-wrapping shear adhesion strength, the more effective the prevention of the film from clinging to itself, and the preferred pre-wrapping shear adhesion strength is 0. On the other hand, control of the clinging properties of the sticky surface of the wrapping film such that a shear adhesion strength (hereinafter called a "wrapping-time shear adhesion strength") as measured after bringing the sticky surface into contact under a pressure of 4 kPa with the glass surface becomes 700 cN/25 cm$^2$ or greater, preferably 800 cN/25 cm$^2$ or greater, more preferably 900 cN/25 cm$^2$ or greater makes it possible to keep a target item such as a container or a food item in a wrapped state while permitting prevention of the film from clinging to itself until wrapping. A wrapping-time shear adhesion strength smaller than 700 cN/25 cm$^2$ is unable to exhibit practically sufficient clinging properties. Although a greater wrapping-time shear adhesion strength makes it possible to perform more complete wrapping of a target item, it is preferable for a rolled wrapping film to set the upper limit of the wrapping-time shear adhesion strength at 2400 cN/25 cm$^2$ or so because the rolling-out easiness of the film would otherwise be hardly maintained well.

On the other hand, clinging properties upon peeling off a wrapping film from a target item such as a container or a food item can be expressed in terms of peel adhesion strength at 90°.

Described specifically, control of the clinging properties of a sticky surface of a wrapping film such that a peel adhesion strength at 90° (hereinafter called a "post-wrapping peel strength") as measured after bringing the sticky surface into contact with a glass surface having a surface roughness Ra (arithmetic mean roughness), as defined in B601-1994 of the Japan Industrial Standards (JIS), of from 0.7 to 1.5 nm becomes 40 cN/2.5 cm or less, preferably 20 cN/2.5 cm or less, more preferably 10 cN/25 cm or less makes it possible to facilitate removal of the wrapping film when the wrapping film is peeled off upon using a target item such as a container or a food item after wrapping the target item.

For handling ease, it is preferred that the wrapping film can be rolled out by a light force upon rolling it out. In terms of unrolling resistance, a value of 300 cN or smaller, preferably 200 cN or smaller, notably 150 cN or smaller is preferred.

The wrapping film according to the first embodiment of the present invention can be provided with a desired shear adhesion strength by forming convexities on a surface of the film.

These convexities can prevent the film from firmly clinging to itself even if they are caused to collapse by a winding pressure upon being formed into a roll, and can restore an effective shape when the film is rolled out. The opposite side of the film may contain concavities at locations corresponding to the convexities, or may present a flat surface.

When convexities are formed to control the clinging properties of the wrapping film according to the first invention, the convexities are brought into contact with each other under such a low pressure (4 Pa) as clinging the film to itself before wrapping is performed. Compared with a flat wrapping film, the area of contact becomes smaller so that clinging properties are reduced. Under a high pressure (4 kpa) applied upon actually performing wrapping, on the other hand, the area of contact becomes greater so that sufficient clinging properties are exhibited. In other words, the side of the wrapping film, on which the convexities are formed, primarily functions as a pressure-sensitive adhesive side. In this case, the degree of clinging properties can be controlled depending on the height of the convexities, the area percentage of the convexities as viewed in plan, and/or the like.

Illustrative methods for the formation of the convexities can include formation of convexities on a flat film by a method such as screen printing, offset printing or gravure printing, formation of wrinkle-like convexities or microscopic or macroscopic convexities on a surface of a flat film by rolling and pressing the flat film with a metal roll, resin roll or rubber roll or any other processing roll, formation of convexities on a film by forming the film, mounting the film on a network-patterned roll or conveyor and then sucking the film from an opposite side, and formation of convexities by embossing which makes use of an embossing roll and a smoothing roll. Use of embossing is particularly preferred.

When embossing is used, the smoothing roll which is employed in combination with the embossing roll may preferably be a rubber roll, a urethane roll, a Vent-Sure Type II roll, a resin roll or the like, which has Shore hardness A of from 50 to 90°, especially from 60 to 90° or Shore hardness D of from 40 to 100°, especially from 40 to 90° (as measured by the type A durometer hardness test or the type D durometer hardness test in JIS K6253). Embossing can include, but are not limited to, nested embossing and tip-to-tip embossing. Usable embossed patterns can include, for example, non-continuous patterns such as dot patterns and polka dot patterns and continuous patterns such as lattice patterns, stripe patters and line patterns. Convexities may be stabilized in shape by conducting roll-pressing subsequent to embossing.

Whichever method is used for the formation of convexities, it is preferred from the standpoints of the handling properties of the wrapping film before wrapping and exhibition of sufficient clinging strength upon wrapping to control the area percentage of the convexities at 1 to 30%, especially 1 to 25% as viewed in plan. Further, the height of the convexities (the height from a surface of a flat portion, on which the convexities are formed upright, to the top of the convexities) has a correlation with the thickness of the flat portion of the wrapping film and, when the thickness is 5 to 30 µm, the height of the convexities may preferably range from 1 to 50 µm, especially from 2 to 30 µm for similar reasons as in the case of the above-described area percentage. Further, the ratio of the height of the convexities to the thickness of the flat portion (the former/the latter) may preferably range from 0.03 to 1.67, especially from 0.08 to 1.00 from the standpoint of the ease in forming the convexities. In addition, the apparent thickness of the wrapping film, that is, the sum of the height of the convexities and the thickness of the flat portion may preferably in a range of from 5 to 60 µm, especially from 5 to 40 µm for similar reasons.

When the convexities are in a non-continuous pattern such as dots, it is preferred from the standpoints of the handling properties of the wrapping film according to the present invention before wrapping and exhibition of sufficient adhesion strength upon wrapping that the convexities are formed as many as 1 to 200 convexities/cm$^2$, especially 1 to 150 convexities/cm$^2$ at every part of the wrapping film.

The present invention is not limited to the above-descried embodiments, and for example, convexities may be formed on both sides of a wrapping film to have sticky surfaces on both sides. In this embodiment, the pre-wrapping shear adhesion strengths of the respective sides may be the same or different, and so the wrapping-time shear adhesion strengths of the respective sides.

The shape and height of embossed convexities are accurately measured using a three-dimensional SEM ("ESA-300", tradename; manufactured by ELIONIX CORP.). A film with convexities formed thereon, on which gold has been deposited in a vapor deposition chamber by a usual method, is placed in a probe. A bird's eye view of an SEM image is obtained at a magnification (x 30) close to a minimum, said magnification being set depending on the convexities, and a highest convexity and a base film portion are selected. A mode is set to measure a cross-section which extends through the highest convexity, and the height of the convexity is then determined.

The wrapping film according to the second embodiment has convexities sufficient to provide at least one of sides thereof with a roughness and waviness (Ra') of 40 nm or greater. An Ra' value smaller than 40 nm causes the film to cling to itself, leading to poor handling properties. The Ra' value may preferably be 40 nm to 1 mm, with 200 nm to 1 mm being particularly preferred. The roughness and waviness (Ra') is a value calculated from a value which is in turn measured at a stylus diameter of 5 µm and a stylus pressure of 50 µg by a tracer-type surface roughness tester. The Ra' value is calculated from a profile curve (cut-off value: 0), which represents roughness and waviness in combination, in accordance with the following formula:

$$Ra' = \frac{1}{L}\int_0^L |f(x)|dx$$

where

L: measuring length f(x): profile curve–center line.

Each film sample is fixed at opposite ends thereof by adhesive tapes on a surface of a "White Slide Glass S111 (tradename; product-of Matsunami Glass K.K.) such that the film sample does not contain any wrinkle, and is mounted on a sample stand. When the Ra' value is not greater than 10 µm, a measurement is conducted by setting the length of the film sample at 4 mm, and the Ra' value of the film sample is calculated. When the Ra' value is greater than 10 µm, a measurement is conducted by setting the length of the film sample at 30 mm, and the Ra' value of the film sample is determined by calculation. The measurement is conducted at the part which includes the convexities.

No particular limitation is imposed on the pattern of such convexities on a film surface, and the convexities may be formed at random or at constant intervals. The other side of the film, which is opposite to the side on which the convexities are formed, may be provided with concavities or may be left flat.

The convexities of the film may be applied preferably over 5% or more of the whole area, notably over 10 to 100% of the whole area.

These convexities can prevent the film from firmly clinging to itself even if they are caused to collapse by a winding pressure upon being formed into a roll, and can restore an effective shape when the film is rolled out.

No particular limitation is imposed on the method for forming the convexities on the film surface. Illustrative methods can however include formation of convexities on a film by transferring the roughness of a surface of a roll having a surface roughness, such as an embossing roll, upon forming the film; formation of convexities on a film by using a so-called embossing roll subsequent to the formation of the film; and as an intermediate processing method, application of surface roughness to a film under the force of suction or the like by causing the film to move on a network-patterned roll or conveyor subsequent to the formation of the film.

The thickness of the film before the formation of the convexities may preferably range from 5 to 50 µm, with 8 to 30 µm being particularly preferred.

Concerning the extensibility of the film, it is preferred that the elongation at break by a tensile test is 10% or greater, especially 20% or greater based on the length before elongation. It is also preferred to have elongation characteristics such that the Ra' value of the film surface becomes smaller than 40 nm by the elongation. With the foregoing in view, the strength at 10% elongation may be preferably 200 cN/10 mm or less, especially 150 cN/10 mm or less when measured in a manner similar to a measuring method of a strength at break.

The measurement of an elongation at break by the tensile test is conducted by using a tension (manufactured by ORIENTEC CORP.) and conducting the measurement under the following conditions: sample width: 25 mm, inter-chuck interval: 100 mm, and pulling rate: 300 mm/minute.

The wrapping films according to the present invention may preferably be those available from polyvinylidene chloride, polyvinyl chloride, or a resin composed primarily of an olefin resin such as polyethylene, polypropylene or polymethylpentene, preferably from a resin composition composed primarily of an ethylene-α-olefin copolymer or a propylene-α-olefin copolymer. Further, a film having a multi-layer structure of at least two layers and available from a resin composition composed primarily of an ethylene-α-olefin copolymer or a propylene-α-olefin copolymer is preferred.

Illustrative examples of a polymer usable in the wrapping films according to the present invention can include, as ethylene-α-olefin copolymers, copolymers with α-olefins such as butene, hexene and octene. Further, as propylene-α-olefin copolymers, copolymers of propylene and α-olefins other than propylene, such as ethylene and butene, can be used. Among polymers composed primarily of ethylene-α-olefin copolymers, those having densities in a range of from 860 to 930 kg/m$^3$ and melting points in a range of from 100 to 130° C. as measured by DSC (heating rate: 5° C./min) can be used suitably. Among polymers composed primarily of propylene-α-olefin copolymers, on the other hand, those having melting points in a range of from 100 to 155° C. as measured by DSC (heating rate: 5° C./min) can be used suitably.

When a resin composition composed primarily of an ethylene-α-olefin copolymer is used, it is preferred for the resin composition to have a melt flow rate (JIS K7210) in a range of from 0.5 to 30 g/10 min, especially from 1 to 20 g/10 min, notably from 1 to 10 g/10 min. A resin composition having a density of from 860 to 930. kg/m$^3$, especially from 900 to 920 kg/m$^3$ is preferred. A density lower than 860 kg/m$^3$ results in a resin having a smaller cohesive power, thereby making it difficult to control the cohesion that the film clings to itself. On the other hand, a density higher than 930 kg/m$^3$ leads to lower clinging properties. Densities outside the above range are therefore not preferred. A resin composition having a melting point of from 100 to 130° C., especially from 115 to 130° C. as measured by DSC (heating rate: 5° C./min) is preferred. A melting point lower than 100° C. cannot provide sufficient heat resistance upon heating the resin composition in a microwave oven. A higher melting point is preferred as far as the heat resistance upon heating in a microwave oven is concerned. Among ethylene-α-olefin copolymers available these days, those having sufficient clinging properties, however, have melting points which fall within the above-described range. Further, blending with various ethylene-base polymers makes it possible to obtain films which are preferred as base films for wrapping films according to the present invention. Upon blending an ethylene-α-olefin copolymer with an ethylene-base polymer, it is preferred to adjust the density of the resulting polymer blend to the range of from 860 to 930 kg/m$^3$ by blending, for example, low-density polyethylene. To improve clinging properties and draping properties, one or more of olefin-base elastomers and styrene-base elastomers may be blended.

When a polymer composed primarily of a propylene-α-olefin copolymer is employed, one having a melt flow rate (JIS K7210) in a range of from 0.5 to 50 g/10 min, especially from 0.5 to 25 g/10 min, in particular from 1 to 15 g/10 min is preferred. Among propylene-α-olefin copolymers, those having sufficient clinging properties have densities which fall within the above-described range. One having a melting point of from 100 to 155° C., especially from 120 to 155° C., in particular from 130° C. to 155° C. as measured by DSC (heating rate: 5° C./min) is preferred. A melting point lower than 100° C. cannot provide sufficient heat resistance upon heating the polymer in a microwave oven. A higher melting point is preferred as far as the heat resistance upon heating in a microwave oven is concerned. Among propylene-α-olefin copolymers available these days, those having sufficient clinging properties however, have, melting points which fall within the above-described range. When a polymer composed primarily of a propylene-α-olefin is employed, one or more of polybutene 1 and polyolefin-base elastomers may be blended.

As an embodiment of the wrapping film according to the present invention, there is a laminated structure containing at least one of the above-described wrapping films. Examples of two-layer structures can include a laminated structure of an ethylene-α-olefin copolymer alone, a laminated structure of a propylene-α-olefin copolymer alone, a laminated structure of an ethylene-α-olefin copolymer and a propylene-α-olefin copolymer, and a laminated structure of an ethylene-α-olefin copolymer or a propylene-α-olefin copolymer in combination with a polymer selected from polyethylene, polypropylene, an amorphous polyolefin, polymethyl-pentene, nylon, a polyester, a polycarbonate, a poly-arylate, polymethyl methacrylate, cellophane, an ethylene-vinyl alcohol copolymer, polystyrene, polyacrylonitrile, polyvinyl chloride or polyvinylidene chloride. Examples of three-layer structures can include laminated structures in each of which surface layers made of an ethylene-α-olefin copolymer or a propylene-α-olefin copolymer are combined with a core layer made of a polymer selected from polyethylene, polypropylene, an amorphous polyolefin, polymethyl-pentene, nylon, a polyester, a polycarbonate, a poly-arylate, polymethyl methacrylate, cellophane, an ethylene-vinyl alcohol copolymer, polystyrene polyacrylonitrile, polyvinyl chloride or polyvinylidene chloride.

When importance is placed on the cutting readiness by a saw blade arranged on a dispensing carton of a wrapping film, a laminate making use of an ethylene-α-olefin copolymer or a propylene-α-olefin copolymer as a surface layer or surface layers and a resin having a log (e/s) of 0.5 or greater, in which e stands for an Olsen stiffness (MPa) as measured in accordance with ASTM D747 and s-stands for an elongation at break (%) as measured in accordance with ASTM D638, as a back layer or a core layer can be used preferably. It is more preferable to control a log (e/s), which is obtained from an Olsen stiffness (MPa) and an elongation at break (%) measured as values of the whole laminated film, at 0.5 or greater. As an indication for cutting readiness, a tear strength of 350 cN or lower as measured in accordance with JIS P8116 is preferred. Further, a tear strength of 200 cN or lower, especially 100 cN or lower can provide good cutting readiness. A tear strength higher than 350 cN is not desired, because cutting is not feasible or a large force is needed for cutting. Although a lower tear strength leads to better cutting readiness, it is necessary to take into consideration a tear strength range in which satisfactory strength is available for actual use.

Selection of an olefin resin for the formation of a back layer or a core layer makes it possible to obtain a laminated film having good formability and good interlaminar strength. A reduction in interlaminar strength is not preferred because it deteriorates cutting readiness. If a combination of layers does not have good interlaminer strength, this problem can be overcome by arranging a further layer which has adhesive properties to the respective layers. As a method for imparting cuttability, stretching in a cutting direction can be mentioned. Upon stretching, it is preferred to stretch the film twofold to ninefold based on the initial size. To have the film balanced dynamically, stretching may be performed in a cutting direction and also in a direction perpendicular to the cutting direction. Upon performing this stretching, draw ratios of from twofold to sixfold may be combined although they depend on the draw ratio of the transverse stretching.

The laminated film may preferably have an overall thickness in a range of from .5 to 50 μm.

Concerning the thickness percentages of the individual layers, the core layer may preferably account for 10 to 70%, especially 10 to 50%, in particular 10 to 25% of the overall thickness of the laminated film when the laminated film is, for example, a 3-layer film composed of surface layer/core layer/surface layer or a 5-layer film composed of surface layer/adhesive layer/core layer/adhesive layer/surface layer. If the thickness percentage of the core layer is smaller than 10%, no sufficient cuttability can be obtained. If the core layer accounts for more than 75% of the overall thickness, the surface layers cannot be formed with any sufficient thickness. Thickness percentages of the core layer outside the above-described range are therefore not preferred.

No particular limitation is imposed on the production process of these laminated structures. Examples of the production process can include tandem- or co-extrusion and dry lamination.

No particular limitation is imposed on the wrapping film according to the present invention, insofar as the above-described physical properties are satisfied. It is however preferred to form a number of convexities regularly or irregularly on a film added with additives as needed, said additives being those employed in general films, for example, tackifiers, lubricants, surfactants and the like.

Of these, illustrative of the tackifiers are those described in "Kobunshi Kako (Polymer Processing)", Extra Issue 8, Adhesion, page 105, Table 1, The Kobunshi Kankokai Publishing Association, Reprinted: Jul. 15, 1976), for example, natural resins such as rosin and dammar; modified resins such as polymerized resin and partially-hydrogenated rosin; rosin and modified rosin derivatives such as glycerin ester rosin and pentaerythritol-rosin ester; polyterpene resins such as α-pinene polymer, β-pinene polymer and dipentene polymer; and terpene derivative-terpene resins such as terpene phenol-α-pinenephenol copolymer.

Illustrative of the lubricants are hydrocarbon liquids such as polybutene and ethylene-α-olefin oligomer; paraffinic, naphthenic and aromatic lubricants such as liquid paraffin and process oils; and naturally-occurring lubricants, for example, plant-derived lubricants such as soybean oil, corn oil, rape seed oil, olive oil and castor oil, and animal-derived lubricants such as beef tallow.

No particular limitation is imposed on the surfactants insofar as they have been approved as food additives. Particularly preferred are glycerin fatty acid esters, polyglycerin fatty acid esters, those obtained by acetylating hydroxyl groups of these esters, sorbitan fatty acid esters, polyoxyethylene fatty acid esters, and condensates of polyoxyethylene and fatty alcohols.

The wrapping film according to the second invention is a film made of a resin, which is composed primarily of polyvinylidene chloride, polyvinyl chloride, or an olefin resin such as polyethylene, polypropylene or polymethylpentene, and having convexities formed thereon;

preferably, a film obtained from a resin composition, which is composed primarily of an ethylene-α-olefin copolymer or a propylene-α-olefin copolymer, and having convexities formed thereon; more preferably, a film having a multilayer structure of at least two layers, obtained from a resin composition composed primarily of an ethylene-α-olefin copolymer or a propylene-α-olefin copolymer, and having convexities formed thereon.

As polymers usable for the wrapping film according to the second embodiment, the same polymers as those described above in connection with the first invention can be used.

Similarly to the above-described first invention, the wrapping film according to the second invention can be added with additives employed in ordinary films, for example, tackifiers, lubricants, surfactants and the like as needed.

The wrapping film according to the present invention can be produced by imparting roughness to a surface of a film obtained from the above-described polymer by a method known per se in the art.

In general, wrapping films are available in two forms. In a first form, a wrapping film is wound into a roll called "a small-diameter roll" (into a form in which the film is wound on and around an outer peripheral wall of a paper tube) and is placed in a dispensing carton. A user uses the film by rolling it out and cutting it in a desired size. In a second form, a wrapping film is wound into a roll as described above. With a paper tube supported on a holder which is provided with a special cutting tool (for example, a metal-made blade in the form of a saw blade, a heated metal wire, or the like), a user rolls out the film, cuts it in a desired size and then uses the same.

The wrapping films according to the present invention (including both the first and second inventions) have good handling properties because, as mentioned above, they do not cling to themselves before wrapping, show good clinging properties to target items upon wrapping, and can be easily peeled off after wrapping. Therefore, the wrapping films according to the present invention are useful especially when they are wound into rolls called "small-diameter rolls".

The present invention will hereinafter be described further by Examples.

In the Examples of the present invention, the wrapping films were all evaluated in the form of small-diameter rolls. Upon forming each wrapping film into a small-diameter roll, the wrapping film was wound over 20 m at a winding speed of 10 m/min while pressing a film-winding paper tube (inner diameter: 35.6 mm, outer diameter: 38.1 mm) against an NBR resin rubber roll (outer diameter: 100 mm, Shore hardness A: 90°) under a pressing force of 1.86 N/cm.

EXAMPLE 1

On a commercial multi-layer wrapping film made primarily of polyethylene ("NEW VIEW WRAP", tradename; product of Hitachi Chemical Filtec Inc.; thickness: 10 μm), a number of convexities was regularly formed by a dot-patterned embossing roll and a Vent-Sure Type II roll having a Shore hardness D of 90°. The area percentage of the convexities was 13%, and the density and height of the convexities were 80 convexities/cm$^2$ and 15 μm, respectively.

EXAMPLE 2

On a commercial single-layer wrapping film made primarily of polyvinylidene chloride ("Saran Wrap", trademark; product of Asahi Chemical Industry Co., Ltd.; thickness: 11 μm), a number of convexities was regularly formed by a dot-patterned embossing roll and a urethane roll having a Shore hardness D of 60°. The area percentage of the convexities was 4%, and the density and height of the convexities were 25 convexities/cm² and 5 μm, respectively. The tear strength of that film was 10 cN.

EXAMPLE 3

On a commercial multi-layer wrapping film made primarily of polypropylene ("REED COOKING WRAP", tradename; product of Lion Corporation; thickness: 8 μm), a number of convexities was regularly formed by a dot-patterned embossing roll and a Vent-Sure Type II roll having a Shore hardness D of 90°. The area percentage of the convexities was 13%, and the density and height of the convexities were 80 convexities/cm² and 10 μm, respectively. The tear strength of that film was 35 cN.

EXAMPLE 4

On a commercial wrapping film having a surface layer made primarily of polymethylpentene ("FOR WRAP", trademark; product of Riken Vinyl Industry Co., Ltd.; thickness: 10 μm), a number of convexities was regularly formed by a dot-patterned embossing roll and a urethane roll having a Shore hardness D of 90°. The area percentage of the convexities was 4%, and the density and height of the convexities were 25 convexities/cm² and 10 μm, respectively. The tear strength of that film was 86 cN.

EXAMPLE 5

On a commercial wrapping film having a surface layer made primarily of polyethylene ("NEW POLYWRAP", tradename; product of Ube Film, Ltd.; thickness: 10 μm), a number of convexities was regularly formed by a dot-patterned embossing roll and a vent-Sure Type II roll having a Shore hardness D of 90°. The area percentage of the convexities was 13%, and the density and height of the convexities were 80 convexities/cm² and 10 μm, respectively. The tear strength of that film was 130 cN.

EXAMPLE 6

On a commercial wrapping film having a surface layer made primarily of polypropylene ("ECOPLUS", trademark; product of ITOCHU SANPLUS CO., LTD.; thickness: 10 μm), a number of convexities was regularly formed by a dot-patterned embossing roll and a Vent-Sure Type II roll having a Shore hardness D of 90°. The area percentage of the convexities was 13%, and the, density and height of the convexities were 80 convexities/cm² and 10 μm, respectively. The tear strength of that film was 16 cN.

EXAMPLE 7

As a film of the A/B/A three-layer structure, a 12-μm film of 4 μm/4 μm/4 μm was obtained with a three-layer co-extrusion machine by using a resin composit which was composed of 100 parts by weight of low-density linear polyethylene having a density of 0.917 g/cm³ and a melt flow rate of 3.5 g/10 min ("FG982", tradename; product of Nippon Unicar Co., Ltd.), 3 parts by weight of polybutene ("lOOR", tradename; product of Idemitsu Petrochemical Co., Ltd.) as a tackifier and 3 parts by weight of olive oil (product of Ajinomoto Co., Inc.) as a lubricant—as a resin for the layers A and a cyclic olefin copolymer ("APL6015T", tradename; product of Mitsui Chemicals, Inc.) as a resin for the layer B. A number of convexities was regularly formed on the film by a dot-patterned embossing roll and a Vent-Sure Type II roll having a Shore hardness D of 90°. The area percentage of the convexities was 13%, and the density and height of the convexities were 80 convexities/cm² and 20 μm, respectively. The tear strength of that film in the transverse direction (the direction in which the film is cut by a saw blade) was 10 cN.

EXAMPLE 8

As a film of the A/B/A three-layer structure, a 12-μm film of 5 μm/2 μm/5 μm was obtained with a three-layer co-extrusion machine by using the resin of Example 7 as a resin for the layers A and polymethylpentene—which had a density of 833 Kg/m³, a melt flow rate of 26 g/10 min and a log(e/s) of 1.6 ("TPX RT18", tradename; product of Mitsui Chemicals, Inc.)—as a resin for the layer B. A number of convexities was regularly formed on the film by a dot-patterned embossing roll and a Vent-Sure Type II roll having a Shore hardness D of 90°. The area percentage of the convexities was 13%, and the density and height of the convexities were 80 convexities/cm² and 15 μm, respectively. The transverse tear strength of that film was 14 cN.

EXAMPLE 9

As a film of the A/B/A three-layer structure, a 12-μm film of 4 μm/4 μm/4 μm was obtained with a three-layer co-extrusion machine by using the resin of Example 7 as a resin for the layers A and polypropylene—which had a density of 930 Kg/m³, a melt flow rate of 30 g/10 min and a log(e/s) of 1.6 ("PF611", tradename; product of Montell Polyolefins Company NV)—as a resin for the layer B. A number of convexities was regularly formed on the film by a dot-patterned embossing roll and a Vent-Sure Type II roll having a hardness D of 90°. The area percentage of the convexities was 13%, and the density and height of the convexities were 80 convexities/cm² and 20 μm, respectively. The transverse tear strength of that film was 14 cN.

Comparative Examples 1–6

The commercial wrapping films employed in Examples 1–6 were used as they were without subjecting them to embossing.

Comparative Example 7

A wrapping film produced on a trial basis in Example 7 was used as it was without subjecting it to embossing.

Comparative Examples 8 and 9

The commercial wrapping film employed in Example 5 was pressed by a roll with a #1500 sand paper wound thereon, whereby scuff marks were formed over the entire surface (Comparative Example 8) or on a peripheral edge portion (Comparative Example 9).

Comparative Example 10

Using high-density polyethylene ("HI-ZEX 1300J", tradename; product of Mitsui Chemicals, Inc.) as a resin, a 15-μm thick film was obtained through a T-die. That film was formed by the production process disclosed in WO 97/25256. However, the exclusion distance $E=2\beta/\sqrt{(\lambda\pi)}$ described on page 20 of WO 97/25256 was calculated using $\beta=0.75$, $\lambda=700$ (the unit area was supposed to be "square inch") and $\pi=3.14159$, and the film was formed such that the area percentage of convexities became 50%. In concavities, the pressure-sensitive adhesive ("HL-2115X") described on page 26 of WO 97/25256 was coated to a thickness of 15 μm.

Performance Evaluation

With respect to the wrapping films of the Examples and the Comparative Examples, their shear adhesion strengths were measured under pressures of 4 Pa and 4 kPa, respectively, by a method to be described below. Further, the handling ease and adhesive properties of the wrapping films were also evaluated by methods to be described below. The results are shown below in Table 1.

[Shear Adhesion Strength]

(1) Measuring Instrument

On a stand ("MODEL-2252", tradename; manufactured by Aicoh Engineering K.K.), a push-pull gage manufactured by the same company was arranged. A glass-made Petri dish [chosen from those having surface roughness Ra in a range of from=0.7 to 1.5 nm; measured by "P-2" (tradename) manufactured by Tencor Corp.], a surface of which had been brought into a clean state by wiping it with "KIM WIPE WIPER S200" (tradename; product of Jujo-Kimbury K.K.) applied with ethanol (product of Junsei Chemical Co., Ltd.; first-grade reagent), was fixed on the measuring stand. A label sheet ("PPC Label Sheet KB-A190", tradename; product of KOKUYO CO., LTD.) with a 50 mm×50 mm window cut out therein was affixed to an upper wall of the Petri dish such that a glass surface (target surface) with which a wrapping film is brought into contact is exposed through the window. To hold each measurement sample, a clip was attached to a free end of the push-pull gage. The spacing between the clip and the glass surface was set at 20 mm.

(2) Sampling and Setting

One of the wrapping films, as a target of measurement, and the measuring instrument were placed in an environment of 20° C. and 65% RH. The wrapping film was cut in the machine direction to provide a piece of 50 mm in length and 100 mm in width as a sample. On the other hand, the above-described glass surface (target surface) was covered by a piece of tracing paper cut in an adequate size (tracing paper; product of KOKUYO CO., LTD.). The sample was placed on the tracing paper such that the sample covered the glass surface. The sample was then held at a longitudinal end portion thereof by the clip. Next, the tracing paper was slowly drawn out to make the sample and the glass surface face each other.

(3) Pressing Method and Measuring Methods

For the measurement of a shear adhesion strength under the pressure of 4 Pa, a coated cardboard was first cut in a predetermined size such that a load to the sample became 4 Pa. The coated cardboard was placed for 10 seconds on the sample, whereby the sample was brought into contact with the glass surface. Ten seconds later, the coated cardboard was removed, and the sample was then pulled at a rate of 800 mm/min to measure its shear adhesion strength.

In the measurement of a shear adhesion strength under the pressure of 4 kPa, a cut pile carpet ("CAESAR US-3000", tradename; product of Suminoe K.K.) and a weight of a predetermined weight value were employed in place of the coated cardboard such that the load to the sample was controlled to 4 kPa. The carpet was then placed on the sample such that the lower side of the carpet was brought into contact with the sample, whereby the sample and the glass surface were brought into contact with each other. Its shear adhesion strength was then measured in the same manner as described above.

[Peel Adhesion Strength at 90°]

(1) Measuring Instrument

Tensile testing machine: "RTM-25", tradename, manufactured by ORIENTEC CORP.

Measurement mode: Peeling test mode
 Crosshead speed: 30 mm/min
 Inter-chuck interval: 50 mm
 Measured distance: 50 mm
 Load range: 5,000 kgf (rated), range: 1 to 5%.
 Sample width: 25 cm
 Starting point of measurement: 5.0000 mm
 Ineffective amplitude level: 0.0000%

Measuring environment: temperature 20° C., humidity 60% RH.

(2) Measuring Method

Each sample was cut into 100 mm×25 mm, and was arranged on a flat glass surface such that the sample adhered at an area of 25 mm×50 mm to the flat glass surface. The flat glass surface had been chosen from those having surface roughnesses Ra (arithmetic mean roughnesses) in a range of from 0.7 to 1.5 nm as defined in the Japan Industrial Standards (JIS) B601-1994. A 1-kg roller (width: 33 mm, roll diameter: 86 mm, roller surface hardness A: 70°, material: NBR) was reciprocated twice to bring the sample into close adhesion with the flat glass surface. The sample was held at an end portion thereof by the clip of the tensile testing machine, and a measurement was conducted in the above-described measuring mode. An average of maximum values of five samples (N=5) was recorded as a peel adhesion strength at 90°. Maximum values of each sample were determined at peeling angles of 90°±10°, between the sample and the glass surface.

[Unrolling Resistance]

(1) Measuring Instrument

Tensile testing machine: "RTA-100", tradename, manufactured by ORIENTEC CORP.

Measurement mode: Peeling test mode
 Crosshead speed: 1000 mm/min
 Inter-chuck interval: 30 mm
 Measured distance: 50 mm
 Load range: 5,000 kgf (rated), range: 1 to 5%.
 Sample width: 30 cm
 Starting point of measurement: from a minimum point
 Ending point of measurement: L=50.000 mm Measuring environment: temperature 20° C., humidity 60% RH.

(2) Measuring Method

An iron rod (diameter: 10 mm) was inserted through a paper tube with a sample wound thereon, and the sample was set on a sample-fixing table. The film was rolled out over a length of 30 mm (the distance between an unrolling plane and a chuck was 30 mm). A unrolling resistance was measured in the above-described measuring mode. An average of unrolling resistances of five samples (N=5) was recorded as an unrolling resistance value.

[Evaluation of Handling Ease, Unrolling Properties, Adhesive Properties and Peeling Easiness of Wrapping Films]

By 10 monitors, glass-made salad bowls of 18 cm in diameter were actually wrapped with the wrapping films of Examples 1–9 and Comparative Examples 1–10. The handling ease, unrolling properties, adhesive properties and peeling easiness of these wrapping films were ranked in accordance with the below-described standards. Further, overall ranking of these wrapping films was also conducted in accordance with the below-described standards.

(Handling Ease)

A: Seven or more monitors answered that pre-wrapping handling was easy.

B: Five or six monitors answered that pre-wrapping handling was easy.

C: Four or fewer monitors answered that pre-wrapping handling was easy.

(Unrolling Properties)

A: Seven or more monitors answered that pre-wrapping unrolling was easy.

B: Five or six monitors answered that pre-wrapping unrolling was easy.

C: Four or fewer monitors answered that pre-wrapping unrolling was easy.

(Adhesive Properties)

A: Seven or more monitors answered that the wrapping film adhered to the salad bowl.

B: Five or six monitors answered that the wrapping film adhered to the salad bowl.

C: Four or fewer monitors answered that the wrapping film adhered to the salad bowl.

(Peeling Easiness)

A: Seven or more monitors answered that post-wrapping peeling readiness was good.

B: Five or six monitors answered that post-wrapping peeling readiness was good.

C: Four or fewer monitors answered that post-wrapping peeling readiness was good.

(Overall Ranking)

A: All the evaluation items were ranked "A".

B: The ranks of all the evaluation items were in a combination of "A" and "B".

C: At least one of the evaluation items was ranked "C".

In the following Examples, Ra' values were measured under the above-described conditions by using "SURF-COM" (trademark) manufactured by Tokyo Seimitsu K.K. on the other hand, elongations at break were determined by measuring tensile strengths under the above-described conditions with a tensile testing machine manufactured by ORIENTEC CORP.

EXAMPLE 10

Using a blown-film extruder manufactured by Placo Co., Ltd., low-density linear polyethylene having a density of 0.915.g/cm$^3$ and a melt flow rate of 2.3 g/10 min ("ULTZEX", trademark; product of Mitsui Chemicals, Inc.) was formed into a 30-$\mu$m thick film under the following setting: processing temperature: 170° C., blow-up ratio: 1.8, die diameter: 125 mm, and die slit width: 1.0 mm. That film was processed by an embossing machine manufactured by Yuri Roll Co., Ltd., whereby constant-interval embossing was applied with a maximum surface peak-to-valley distance of 0.4 mm and a minimum peak-to-peak distance of 0.7 mm.

The thus-obtained film had an Ra' value of 0.13 mm and an elongation at break of 740%.

EXAMPLES 11–15

The wrapping films shown in Table 2 to Table 4 were produced similarly to Example 10.

TABLE 2

|  | Example 11 | Example 12 |
|---|---|---|
| Polymer | Low-density linear polyethylene* ("FG982", | Low-density linear polyethylene* ("FG982", |

TABLE 1

| | | Pre-shear adhesion strength[A] (cN/25 cm$^2$) | | Peel adhesion strength at 90°[A] (cN/2.5 cm) | Ranking | | | | |
|---|---|---|---|---|---|---|---|---|---|
| | | under 4 Pa | under 4 kPa | | Handling properties | Unrolling properties | Adhesive properties | Peeling easiness | Overall ranking |
| Example | 1 | 120 | 980 | 4 | A | A | A | A | A |
| | 2 | 50 | 1250 | 5 | A | A | A | A | A |
| | 3 | 380 | 960 | 2 | B | A | A | A | B |
| | 4 | 260 | 850 | 2 | A | B | B | A | B |
| | 5 | 130 | 720 | 2 | A | A | B | A | B |
| | 6 | 80 | 820 | 2 | A | A | B | A | B |
| | 7 | 150 | 1500 | 8 | A | A | A | A | A |
| | 8 | 200 | 1480 | 7 | A | A | A | A | A |
| | 9 | 160 | 1450 | 8 | A | A | A | A | A |
| Comparative Example | 1 | 1130 | 1170 | 4 | C | A | A | A | C |
| | 2 | 2080 | 2680 | 6 | C | A | A | A | C |
| | 3 | 1180 | 1230 | 3 | C | A | A | A | C |
| | 4 | 660 | 980 | 3 | C | B | A | A | C |
| | 5 | 730 | 770 | 3 | C | A | B | A | C |
| | 6 | 900 | 980 | 4 | C | A | A | A | C |
| | 7 | 2250 | 2700 | 10 | C | A | A | A | C |
| | 8 | 10 | 20 | 0 | A | A | C | A | C |
| | 9 | 540 | 620 | 2 | C | A | C | A | C |
| | 10 | —* | —* | 50 | C | Not unrollable | A | C | C |

*The wrapping film of Comparative Example 10 was not unrollable, as it firmly cohered when it was wound on a paper core tube under ordinary pressure. Only adhesive properties and peeling easiness were therefore ranked with respect to the wrapping film not wound in rolled form.
[A]A glass-made Petri dish having a surface roughness (Ra) of 1.0 nm was used.

TABLE 2-continued

|  | Example 11 | Example 12 |
|---|---|---|
|  | tradename, product of Nippon Unicar Co., Ltd.) | tradename, product of Nippon Unicar Co., Ltd.) |
| Kneading temperature (° C.) | — | — |
| Forming method | T-die (manufactured by YAMAGUCHI MFG. WORKS, LTD.) Die slit width: 1.0 mm | T-die (manufactured by YAMAGUCHI MFG. WORKS, LTD.) Die slit width: 1.0 mm |
| Processing temperature (° C.) | 200 | 200 |
| Thickness (μm) | 10 | 20 |
| Roughening processing | Embossing machine (manufactured by Yuri Roll Co., Ltd.) Max. surface peak-to-valley distance: 0.2 mm Minimum peak-to-peak distance: 0.5 mm Constant intervals | Roughening processing was performed using, as a T-die cooling roll, an embossing roll sand-blasted to give a surface roughness $R_{max}$ of 8 μm. |
| Ra' value | 70 μm | 640 nm |
| Elongation at break (%) | 760 | 760 |
| 10% elongation strength (cN/10 mm) | 76 | 140 |

*density: 0.917 g/cm³, melt flow rate: 3.5 g/10 min.

TABLE 3

|  | Example 13 | Example 14 |
|---|---|---|
| Polymer | Terpolymer-type polypropylene** ("5C30F", tradename, product of Montell Polyolefins Company NV) - 100 parts by weight Polybutene ("100R", tradename; product of Idemitsu Petro-chemical Co., Ltd.) - 5 parts by weight | Terpolymer-type polypropylene** ("5C30F", tradename, product of Montell Polyolefins Company NV) - 100 parts by weight Polybutene ("100R", tradename; product of Idemitsu Petro-chemical Co., Ltd.) - 10 parts by weight |
| Kneading temperature (° C.) | 200 | 200 |
| Forming method | T-die (manufactured by YAMAGUCHI MFG. WORKS, LTD.) Die slit width: 1.0 mm | T-die (manufactured by YAMAGUCHI MFG. WORKS, LTD.) Die slit width: 1.0 mm |
| Processing temperature (° C.) | 220 | 220 |
| Thickness (μm) | 15 | 10 |
| Roughening processing | Embossing machine (manufac-by Yuri Roll Co., Ltd.) Max. surface peak-to-valley distance: 0.2 mm Minimum peak-to-peak distance: 0.5 mm Constant intervals | Roughening processing was performed using, as a T-die cooling roll, an embossing roll sand-blasted to give a surface roughness $R_{max}$ of 8 μm. |
| Ra' value | 60 μm | 600 nm |
| Elongation at break (%) | 530 | 530 |
| 10% elongation strength (cN/10 mm) | 200 | 140 |

**density: 0.900 g/cm³, melt flow rate: 5.5 g/10 min.

TABLE 4

|  | Example 15 |
|---|---|
| Polymer | PVC film for commercial use ("V-350, tradename; product of Riken Vinyl Industry Co., Ltd.) |
| Kneading temperature (° C.) | — |
| Forming method | — |
| Processing temperature (° C.) | — |
| Thickness (μm) | 13 |
| Roughening processing | Embossing machine (manufactured by Yuri Roll Co., Ltd.) Maximum surface peak-to-valley distance: 0.4 mm Minimum peak-to-peak distance: 0.7 mm Constant intervals |
| Ra' value | 0.1 mm |
| Elongation at break (%) | 130 |
| 10% elongation strength (cN/10 mm) | 190 |

Comparative Example 11

Low-density linear polyethylene ("FG982", tradename; Nippon Unicar Co., Ltd.), which was similar to the resin employed in Example 10, was formed through a T-die. The thickness of the resulting film was 15 μm. The roughness of that film was measured. As a result, its Ra' was determined to be 150 nm.

That film was flexible, but had cohesive properties and clung to itself. It therefore had very poor handling properties.

CAPABILITY OF EXPLOITATION IN INDUSTRY

The wrapping films according to the present invention feature minimized migrants to foods. They do not cling to themselves before wrapping, exhibit good adhesion properties to target items upon wrapping, and have good peelability to permit easy removal after wrapping, so that they have good handling properties.

What is claimed is:

1. A wrapping film having a sticky surface, convexities, and flat portions of film disposed between the convexities on at least one side, and comprising at least one agent selected from the group consisting of a surface active agent, an adhesive agent, and an oily agent, wherein said wrapping film has a shear adhesion strength of at most 400 cN/25 cm² when measured subsequent to bringing said sticky surface into contact with a glass surface having a surface roughness of from 0.7 to 1.5 nm under a pressure of 4 Pa, a shear adhesion strength of at least 700 cN/25 cm² when measured subsequent to bringing said sticky surface into contact with said glass surface under a pressure of 4 kPa, and the ratio of the height of the convexities to the thickness of the flat portion ranges from 0.03 to 1.67.

2. A wrapping film according to claim 1, having a peel adhesion strength at 90° of at most 40 cN/2.5 cm when measured subsequent to bringing said sticky surface into contact with said glass surface.

3. The wrapping film according to claim 1, wherein said wrapping film has convexities sufficient to provide said surface with a roughness and waviness (Ra') of at least 40 nm as measured in a non-extended state, and said wrapping film has an elongation at break of at least 10%.

4. A wrapping film according to any one of claim 1,2 or 3, which comprises polyvinylidene chloride, polyvinyl chloride, or a resin composed primarily of an olefin resin.

5. The wrapping film according to claim 1, wherein the shear adhesion strength measured subsequent to bringing said sticky surface into contact with said glass surface under a pressure of 4 Pa is 300 cN/25 cm$^2$ or less.

6. The wrapping film according to claim 1, wherein the shear adhesion strength measured subsequent to bringing said sticky surface into contact with said glass surface under a pressure of 4 Pa is 260 cN/25 cm$^2$ or less.

7. The wrapping film according to claim 1, wherein the shear adhesion strength measured subsequent to bringing said sticky surface into contact with said glass surface under a pressure of 4 kPa is 800 cN/25 cm$^2$ or greater.

8. The wrapping film according to claim 1, wherein the shear adhesion strength measured subsequent to bringing said sticky surface into contact with said glass surface under a pressure of 4 kPa is 900 cN/25 cm$^2$ or greater.

9. The wrapping film according to claim 1, wherein the convexities are present at a density of 1–200 convexities/cm$^2$.

10. The wrapping film according to claim 1, wherein the film further comprises at least one resin selected from the group consisting of polyvinylidene chloride, polyvinyl chloride, an olefin resin, polyethylene, polypropylene, polymethylpentene, and ethylene-α-olefin copolymer, and a propylene-α-olefin copolymer.

11. The wrapping film according to claim 10, wherein the resin has a melt flow of from 0.5 to 30 g/10 min (JIS K 7210).

12. The wrapping film according to claim 1, wherein said film has a tear strength of 350 cN or lower measured by JISP8116.

13. The wrapping film according to claim 1, wherein said film comprises a core layer and at least one surface layer.

14. The wrapping film according to claim 1, wherein the wrapping film comprises at least one surface active agent selected from the group consisting of glycerin fatty acid esters, polyglycerin fatty acid esters, acetylated glycerin fatty acid esters, acetylated polyglycerin fatty acid esters, sorbitan fatty acid esters, polyoxyethylene fatty acid esters, and condensates of polyoxyethylene and fatty alcohols.

15. The wrapping film according to claim 1, comprising an adhesive agent selected from the group consisting of rosin, dammar, glycerin ester rosin, pentaerythritol-rosin ester, polyturpene resins, α-pinene polymers, β-pinene polymers, dipentene polymers and terpene phenol-α-pinene phenol copolymers.

16. The wrapping film according to claim 1, comprising at least one oily agent selected from the group consisting of hydrocarbon liquids, polybutene, ethylene-α-olefin oligomers, paraffinic lubricants, napthenic lubricants, aromatic lubricants, liquid paraffin, plant-derived lubricants, soybean oil, corn oil, grape seed oil, olive oil, castor oil, and beef tallow.

* * * * *